United States Patent [19]

Niwa et al.

[11] Patent Number: 4,676,720
[45] Date of Patent: Jun. 30, 1987

[54] BEARINGLESS HUB STRUCTURE FOR ROTARY-WING AIRCRAFTS

[75] Inventors: Yoshiyuki Niwa; Masahiro Kashiwagi, both of Tachikawa; Masahiro Yasue, Funabashi; Shunichi Bandoh; Asao Kakinuma, both of Kakamigahara; Tadashi Wakatsuki, Gifu, all of Japan

[73] Assignees: Kawasaki Jukogyo Kabushiki Kaisha, Hyougo; Technical Research and Development Institute, Japan Defense Agency, Tokyo, both of Japan

[21] Appl. No.: 753,338

[22] Filed: Jul. 9, 1985

[30] Foreign Application Priority Data

Jul. 10, 1984 [JP] Japan .................................. 59-142877
May 9, 1985 [JP] Japan .................................. 60-98586
Jun. 18, 1985 [JP] Japan .................................. 60-132139

[51] Int. Cl.$^4$ ............................................. B64C 27/38
[52] U.S. Cl. .................................. 416/134 A; 416/141
[58] Field of Search .................. 416/226, 223, 134 A, 416/141 R, 138 A

[56] References Cited

U.S. PATENT DOCUMENTS 3,261,407 7/1966 Culver et al. ........................ 416/226
4,008,980 2/1977 Noehren et al. ..................... 416/226
4,292,009 9/1981 Weiland et al. ...................... 416/226
4,299,538 11/1981 Ferris et al. ...................... 416/134 A
4,427,340 1/1984 Metzger et al. .................. 416/134 A
4,516,909 5/1985 Caramaschi et al. ............ 416/134 A Primary Examiner—Robert E. Garrett
Assistant Examiner—John Kwon
Attorney, Agent, or Firm—Kerkam, Stowell, Kondracki & Clarke

[57] ABSTRACT

A bearingless hub structure for rotary-wing aircrafts comprising a hub body secured to a rotor shaft, a plurality of radially extending flexbeams integrally formed with the hub body, and pitch housings enclosing each of the flexbeams in spaced relationship, the pitch housing having a radially outer end portion rigidly secured to an inboard end of a rotor blade and a radially inner end portion supported by a spherical bearing in the vicinity of a root end of said flexbeam.

The flexbeam consists of a flexible element of low lead-lag stiffness and a torsion element of low torsional stiffness located radially outside the flexible element. The flexible element consists of two beam-like members having radially inner ends spaced in the lead-lag direction and extending radially outward with narrowing the distance between them, the beam-like member having radially outer end connected to a radially inner end of the torsion element.

6 Claims, 40 Drawing Figures

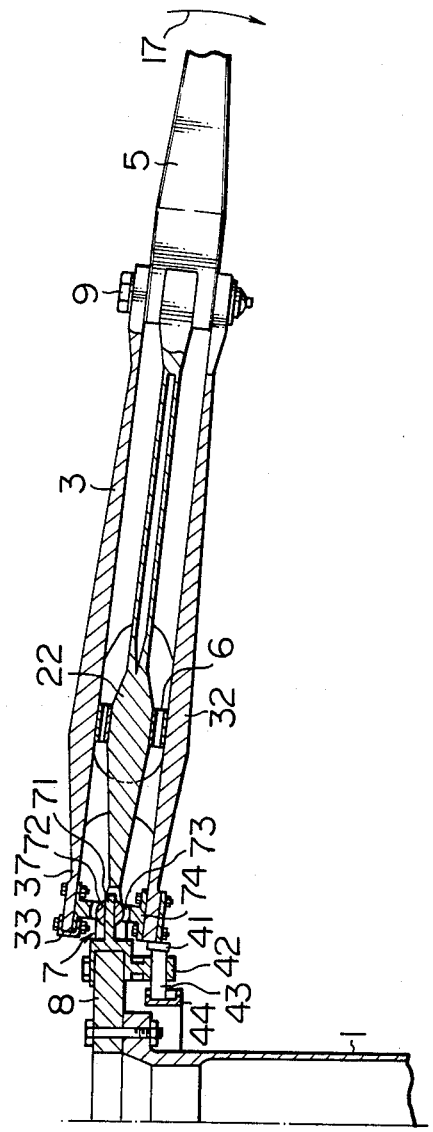
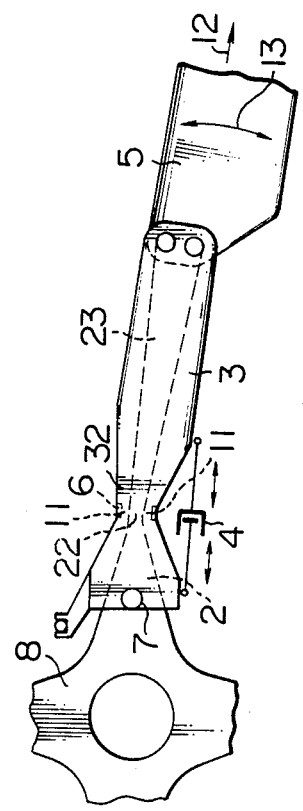

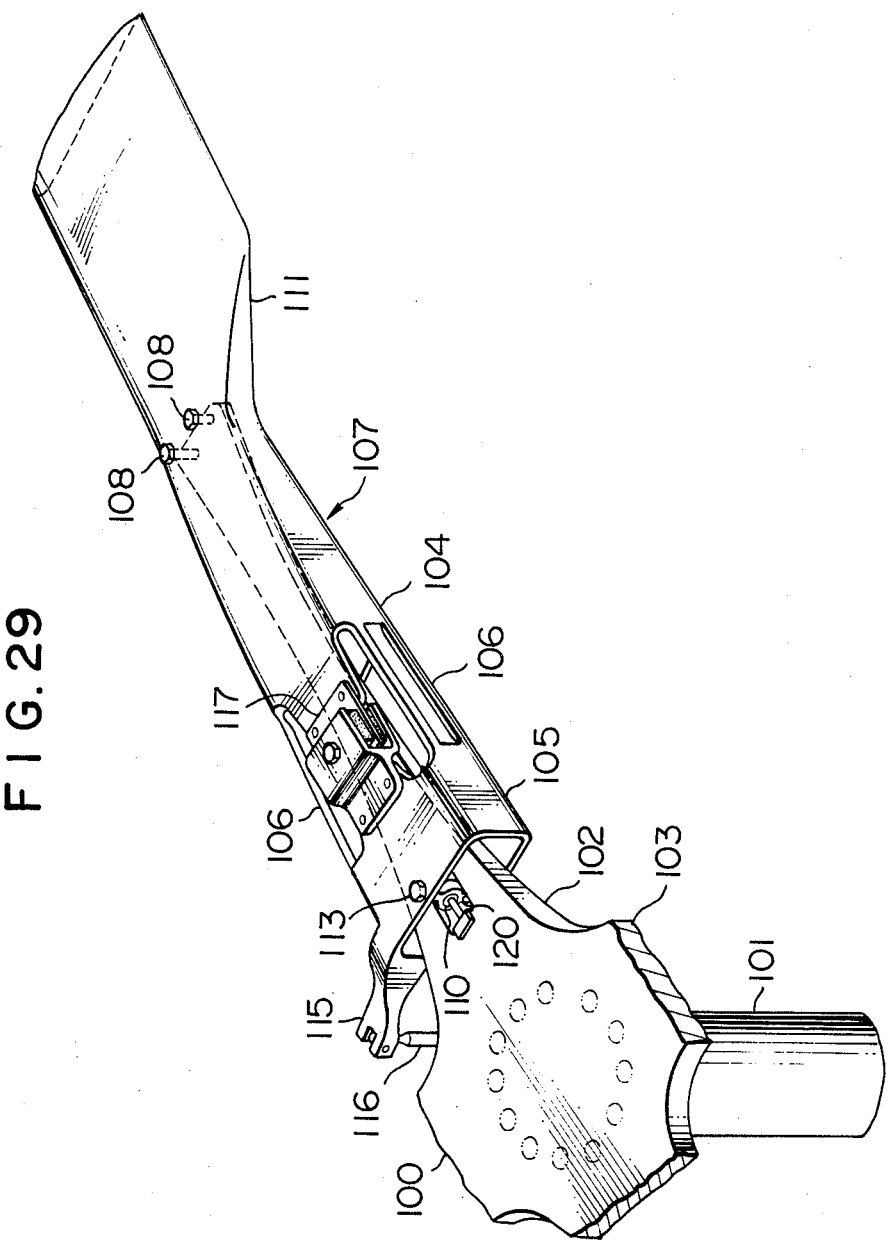

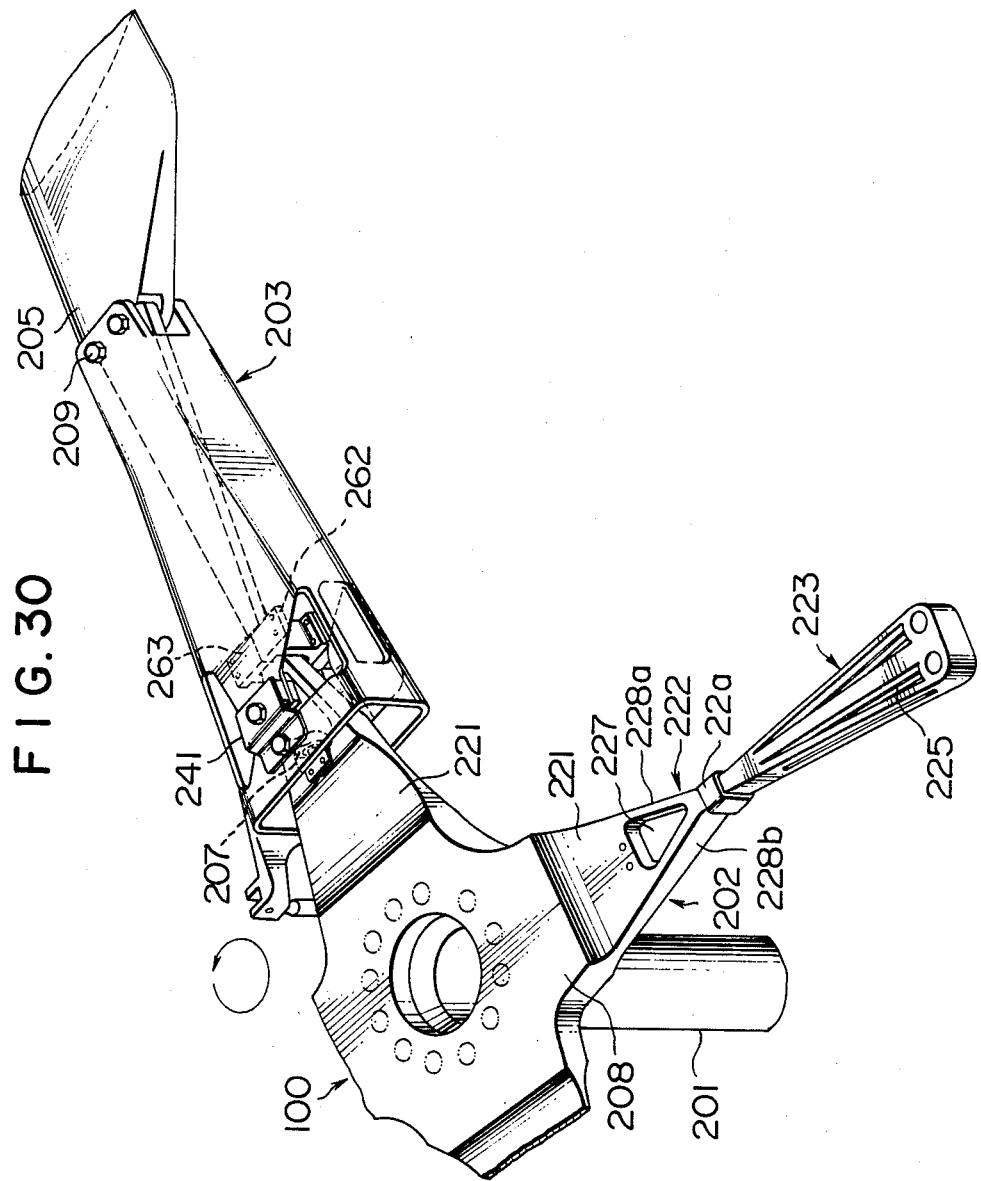

F I G. 31
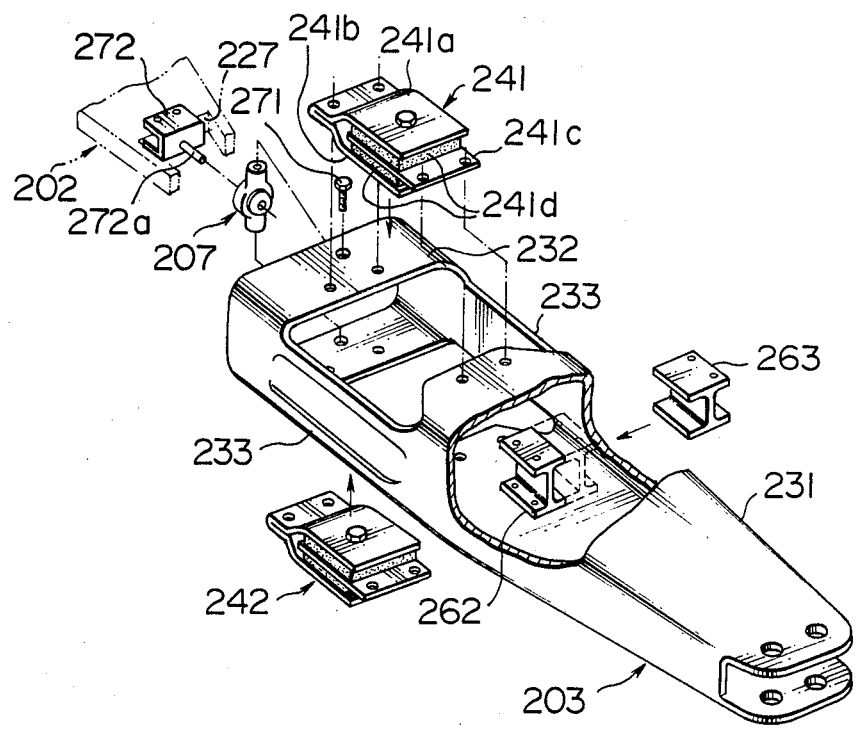

FIG. 32
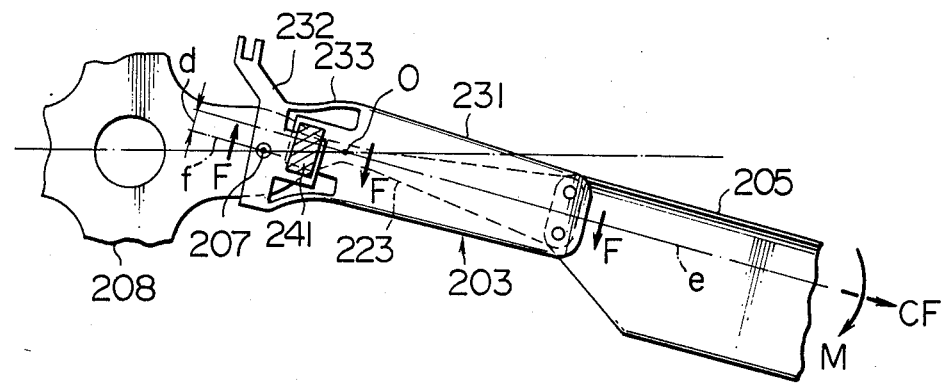
FIG. 33
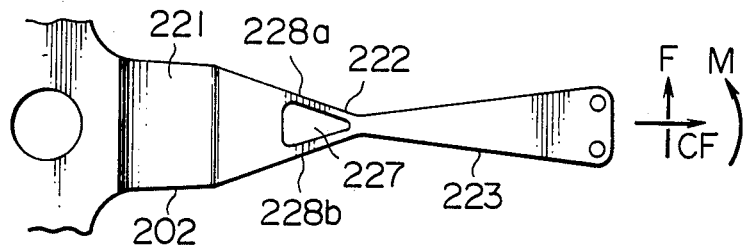
FIG. 34
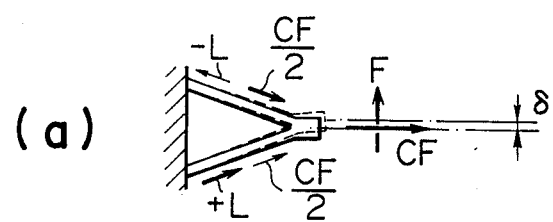
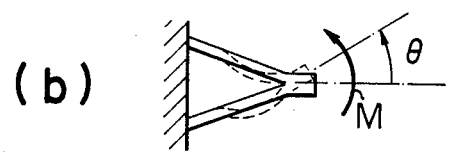

BEARINGLESS HUB STRUCTURE FOR ROTARY-WING AIRCRAFTS

BACKGROUND OF THE INVENTION

1. Field of the Invention

The present invention relates to a hub structure and more particularly to a bearingless hub structure for rotary-wing aircrafts.

2. Description of the Prior Art

A conventional common hub structure for rotary-wing aircrafts is of an articulated type arranged to allow the flapping motion, lead-lag motion and torsional motion of rotor blades. Recently, bearingless hubs utilizing composite materials composed of fiber reinforced plastics having high fatigue strength has been developed. Generally, these bearingless hubs have a structure comprising a hub body secured to a rotor shaft, and a plurality of flexbeam positioned radially at equal spaces apart on the hub body, each flexbeam having a tip-end secured to a rotor blade. The flexbeam is formed of unidirectional composites whose fiber direction is aligned with a spanwise direction, allowing a flapping motion of a rotor blade through it's vertical deflection, a lead-lag motion through it's horizontal deflection, and a pitch change through it's torsion. Amounts of the vertical deflection and torsion are adjusted to be relatively large, and an amount of the horizontal deflection is adjusted to be relatively small.

In order to control pitch angle of the rotor blade, a tubular pitch housing of high bending and torsional stiffness encloses or is positioned parallel to the flexbeam. The pitch housing has an outer end secured to a rotor blade and an inner end supported on the flexbeam through a spherical bearing. Further, the pitch housing is provided at it's inner end with a pitch horn connected to a swashplate through a pitch link. For a main rotor, a lead-lag damper is also provided for the pitch housing. There have been proposed various approaches for installation of lead-lag damper.

A typical example of aforementioned bearingless hub is disclosed in Japanese Patent Public Disclosure No. 89200/1978. In such hub structure, the flexbeam is unidirectional composites, therefore it is characterized in that it is very strong for tensile and bending loads, but very soft in twisting direction. However, in spite of that characteristics of unidirectional composites, it is difficult to provide angles of torsion corresponding to the pitch changes of the rotor blade. Therefore, it is desirable that the flexbeam should be formed into a thin laminated element of low torsional stiffness. However, if the flexbeam be a thin laminated element, it could not endure bending loads caused during quick starting of the slow rotations because the buckling strength of the thin laminated element is significantly low. Thus, the flexbeams having C or I shaped cross section have often be made. A typical example of such flexbeams is disclosed in Japanese Patent Public Disclosure No. 96197/1978. However, in this structure when a centrifugal force is acting on the rotor blade, the torsional stiffness is increased by a tensile stress effect, so it is necessary to increase the length of the flexbeam, and in some cases, the flexbeam length more than 30% of the rotor radius is required.

The hub mechanism including such long flexbeam is not only disadvantageous in regard to weight and drag but also creates a complicated phenomenon referred as an aeroelastic coupling by interference between the bending deflections of the flapping and lead-lag directions and the torsional deflection. That is, the flexbeam is relatively soft with respect to the flexure in the flapping direction and is relatively stiff with respect to the flexure in the lead-lag direction. When the flexbeam is twisted, the ratio of the bending stiffness for the flapping direction to the bending stiffness for the lead-lag direction varies in accordance with the twisted angles and does not take a constant value. This variation of stiffness results in changes of the natural frequency of the rotor blade, and can cause so-called coupling phenomenons in which the flapping motion, the lead-lag motion and the pitch angle change affect to each other.

Further, another disadvantage of the bearingless hub of this type is that it is difficult to provide the damping for the lead-lag direction. An example of the bearingless hub which overcomes the problem of the lead-lag damping is a bearingless type rotor hub shown in Japanese Patent Application No. 61489/1983 (Japanese Patent Public Disclosure No. 186798/1984). The structure described in above Disclosure has pitch housings, each having a radially outer portion and radially inner portion, which are connected to each other by a pair of bearings or flexible elements mounted on the upper and lower areas respectively, and further connected to each other by a lead-lag damper at the front or the rear in the plane of rotation. In this structure, when the rotor blade makes the lead-lag motion, the pitch housing pivots about said bearings or flexible elements, thereby applying a tensile force or a compressive force on the lead-lag damper which in turn provides the desired damping.

The hub structure described in above Disclosure, in the example utilizing bearing pairs, requires two (2) bearings for connecting the pitch housing portions and two (2) bearings for installing the lead-lag damper. The aims of the bearingless hub is to improve the reliability and maintainability and also to reduce the cost by replacing bearings with flexible members. A fact of requiring four (4) bearings for single pitch housing cancels said primary aims. Also, in the hub structure wherein the inner and outer end portions of the pitch housing connected to each other by a pair of flexible elements instead of a pair of the bearings, the flexible elements must yieldingly be deformed in the lead-lag direction. In order to provide the durability against the deformation, the flexible elements are required to make it thinner in the lead-lag direction and to have a certain degree of length in the radial direction. On the other hand, these flexible elements are required to carry a torsional moment transmitted from the pitch link and a flapping load transmitted from the rotor blade, and to have adequate stiffness as well as the stiffness and strength in the lead-lag direction. These requirements for each directions are contradictory to each other, therefore it is very difficult to design the flexible elements which satisfies these requiements, so many complicated structural problems occur. In addition to such severe problems, the flexible elements are lacking in reliability because if any one of the flexible elements is damaged, only remaining flexible elements could not carry the loads, thereby unavoidably leading to a destructive accident. Further, this structure still requires two bearings for installation of a lead-lag damper.

SUMMARY OF THE INVENTION

It is an object of the present invention to provide a bearingless hub structure which is compact and light in weight, capable of avoidance of the coupling phenomenons and allows large latitude in design.

It is another object of the present invention to provide a hub structure for rotor blades, which minimizes the number of bearing to be used, includes pitch housing which are flexible in the lead-lag direction but having sufficient stiffness and strength for the flapping and torsional loads, and provide an easy installation of lead-lag dampers.

It is still another object of the present invention to provide a bearingless hub structure which provides an easy installation of lead-lag dampers.

It is further object of the present invention to provide a bearingless hub structure which enables the lead-lag dampers to demonstrate there functions sufficiently.

To accomplish these and other objects, a bearingless hub structure for rotary-wing aircrafts of the present invention comprises a hub body secured rigidly to a rotor shaft, a plurality of flexbeams extending radially from the hub body and supporting a rotor blade at it's tip end, and pitch housings enclosing each of said flexbeam in spaced relationship, said pitch housing having a radially outer end portion secured rigidly to an inboard end of a rotor blade and a radially inner end portion supported by a spherical bearing in the vicinity of a root end of the flexbeam, characterized in that said flexbeam consists of a flexible element of low lead-lag stiffness and a torsion element of low torsional stiffness located radially outside said flexible element, and stopper members are positioned at the positions corresponding to said flexible element for coupling said flexbeam and said pitch housing to each other so that pressure loads may be transmitted when an amount of lead-lag flexure reaches to a predetermined value. In accordance with above construction, when a large lead-lag load is applied, the amount of flexure of the flexbeam become large, and the flexbeam become in contact with the pitch housing through the stopper member, so that the pitch housing may carry the lead-lag load in radially outside the stopper member. As a result, a large lead-lag load does not act on the torsion element which exists radially outside said flexible element, so that the torsion element may be a structure with very low torsional stiffness. The flexbeam may be tapered it's cordwise width to a narrow portion by which said flexible element is formed. Also, it is preferable to provide a flapping soft portion radially inside the flexible element. In this manner, the flapping soft portion, the lead-lag soft portion and the torsional soft portion can be formed at different positions to thereby eliminate mutual interferences between the torsional, lead-lag and flapping motions.

The stopper members may be constructed such that under normal flight load conditions, it provides some clearance so that the flexbeam of the torsion element may not become in contact with said the stopper member of the flexible element of the pitch housing, and when the flexbeam is deflected more than predetermined value in the lead-lag direction, the stopper members couple the flexbeam and the pitch housing to each other so that pressure loads may be transmitted. Specifically, the stopper members may be positioned in a manner that they face to the flexible element of the flexbeam at the lead and lag side of the pitch housing and maintain a desired gap in respect to said flexible element in no flexure condition.

In above construction of the present invention, the flexible element of low lead-lag flexural stiffness and the torsion element of low torsional stiffness are formed at different positions on the flexbeam of the hub body, so that the mutual interferences between the lead-lag motion and torsional motion for changing pitch angles may be eliminated and thereby allowing a large latitude in design. In addition, the stopper members for coupling the flexbeam and the pitch housing are attached at positions opposite to the flexible element of the flexbeam, so that the torsion element of the flexbeam is not subjected an excess lead-lag load. Thus the torsion element may be designed with relatively ease.

In another embodiment of the present invention, the hub structure for rotary-wing aircrafts is characterized in that the pitch housing consists of an inner and outer end portions located radially inside and outside respectively said inner end portion being supported by a spherical bearing in vicinity of the root end of the flexbeam of said hub, said outer end portion being rigidly secured to an inboard end of a rotor blade, said inner and outer end portions being coupled by a pair of bridge elements of low lead-lag stiffness and but high flapping stiffness, positioned across the flexbeam of the hub, and also by a pair of lead-lag dampers in the form of plate, positioned at upper and lower position on the flexbeam of the hub.

A pair of bridge members connecting the inner and outer end portions of the pitch housing are positioned parallel or slightly angled to each other, thereby, when the blade makes a lead-lag motion, they yield a flexural deformation to produce a offset between the inner and outer end portions in the direction of rotation. This offset acts, as a shear force, on the lead-lag dampers coupling the inner and outer end portions at upper and lower positions thereof, which in turn produce damping forces.

The most important point of above embodiment of the present invention is that a pair of bridge members are mounted at the center area of the pitch housing, in lead and lag sides. By forming the bridge elements with I shaped cross section for example, the bridge elements are capable of decreasing the lead-lag stiffness, increasing the flapping stiffness and also increasing the torsional stiffness in proportion to the flapping stiffness, therefore desired strength and stiffness for each directions may be provided by these bridge elements without contradiction.

Further, by positioning a pair of bridge elements in lead and lag sides, when the rotor blade makes a lead-lag motion, each of bridge members yields a flexural deformation to produce a parallel movement between the inner and outer end portions of the pitch housing almost without accompanying a rotational or angular displacement relatively. For lead-lag dampers adopted to install on upper and lower portions of the pitch housing, for example, a damper in the form of plate wherein an elastomer member is sandwiched between plate members may be used. This type of damper can be installed to couple the inner and outer end portions directly, without use of bearing. As the result, it is possible to accomplish required damping, reduction of cost and improvement of reliabiity.

The damper itself may be such a structure that it can restrain a flapwise displacement, or a flapping restainer means may be provided on upper and lower portions of the pitch housing. In above cases, there are provided four flapping load carring paths by the dampers or flapping restrainer means and by the bridge elements, therefore, if either of the bridge elements is damaged, there remaining local carring paths can temporarily carry the loads, thereby inproving the reliability of structure. This is most important in aircraft structure.

In still another embodiment of the present invention, a bearingless hub for rotor blades includes a flapping soft portion, a lead-lag soft portion and a torsional soft portion are provided at radially different positions to thereby eliminate mutual interferences between the flapping, lead-lag and torsional motions. Said lead-lag soft portion have a novel structure which is soft for angular motion while stiff for parallel movement in the lead-lag direction, thereby providing a useful bearingless hub structure with a sufficient lead-lag damping. In accordance with the present invention, a bearingless hub structure for rotary-wing aircrafts comprises a hub body secured to the rotor shaft, a plurality of radially extending flexbeam integrally formed with said hub body, pitch housings enclosing each of said flexbeam in spaced relationship, said pitch housing being such type as it consists of a radially outer end portion rigidly secured to an inboard end of a rotor blade and a radially inner end portion supported by a spherical bearing in the vicinity of a root end of the flexbeam, said flexbeam comprising a flexible element of low lead-lag flexural stiffness and a torsion element of low torsional stiffness, located radially outside said flexible element, and said flexible element being formed with two beam-like members having radially inner ends spaced in the lead-lag direction, extending radially outward with narrowing the distance between them, and a radially outer end connected to a radially inner end of said torsion element.

In this hub structure thus constructed two beam-like members of the flexible element of the flexbeam forms an triangle having it's base between the spanwise roots and an apex at a tip end, therefore a lead-lag force caused by a lead-lag motion of the rotor blade produces a compressive force in one of the beam-like members of the flexible element of the flexbeam and a tensile force in other beam-like member. A centrifugal force produces a tensile force in both of beam-like members. A bending moment in the plane of rotation produces a rotational or angular displacement in the area corresponding to an apex of the triangle by two beam-like members i.e., the tips of beam-like members. As a result, the triangle formed by two beam-like members yields a deformation such as a lead-lag displacement at it's apex is relatively small, but an angular displacement is relatively large. Therefore, the lead-lag motion of rotor blade can provide sufficient amount of displacement for the lead-lag damper almost without accompanying a radially inward movement of an equivalent hinge point.

These and other objects and features of the present invention will become more apparent from the following description of embodiments with reference to the accompanying drawings:

FIG. 6 is a cross sectional view taken along line d—d of FIG. 1;

FIG. 7 is a plan view showing the lead-lag motion during normal flight conditions;

FIG. 29 is a perspective view of one embodiment of a pitch housing which is formed as a integral part of the rotor blade;

FIG. 30 is a perspective view of fourth embodiment of a bearingless hub structure for rotary-wing aircrafts in accordance with the present invention;

FIG. 31 is an exploded perspective view of a portion of the hub structure of FIG. 30;

FIG. 32 is a plan view showing the deformation accompanied by the lead-lag motion;

FIG. 33 is a plan view showing the external forces acting on the flexbeam;

Figure 35:
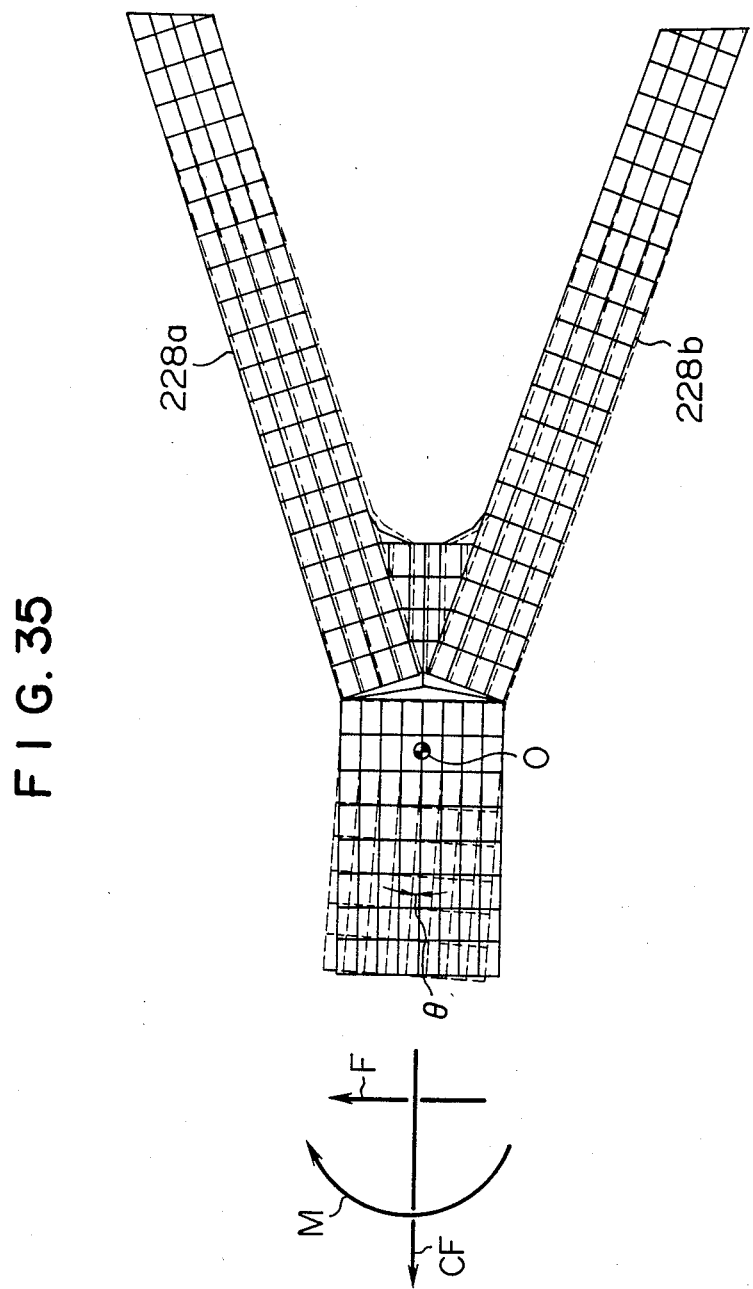
Figure 36:
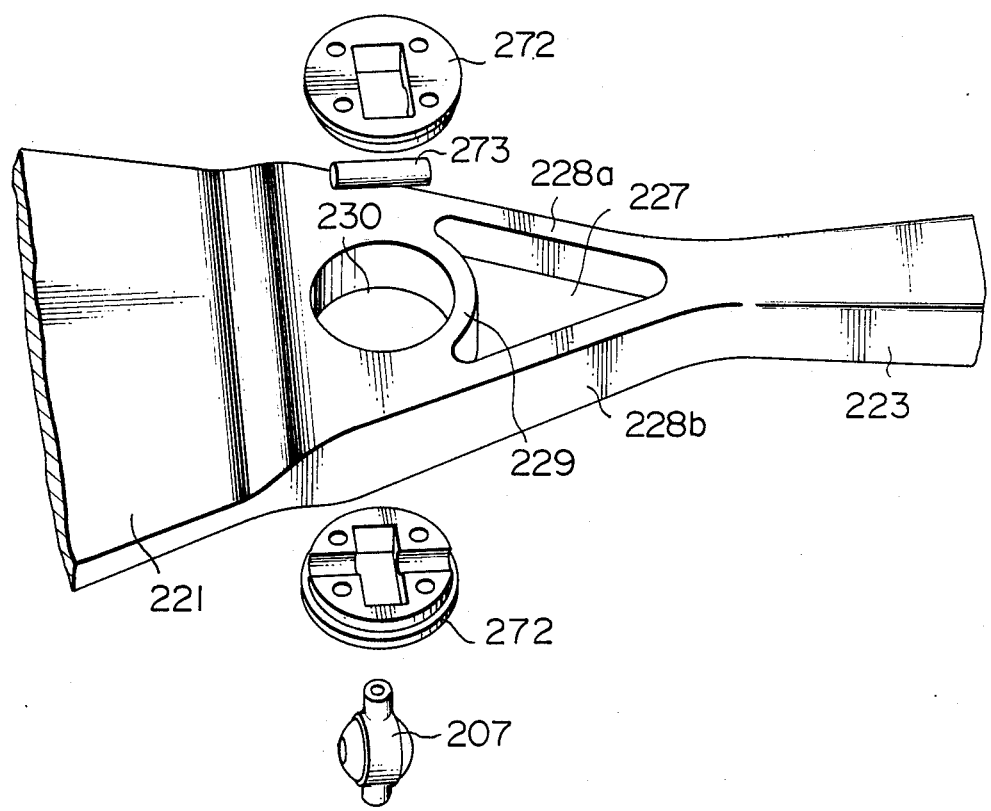
Figure 37:
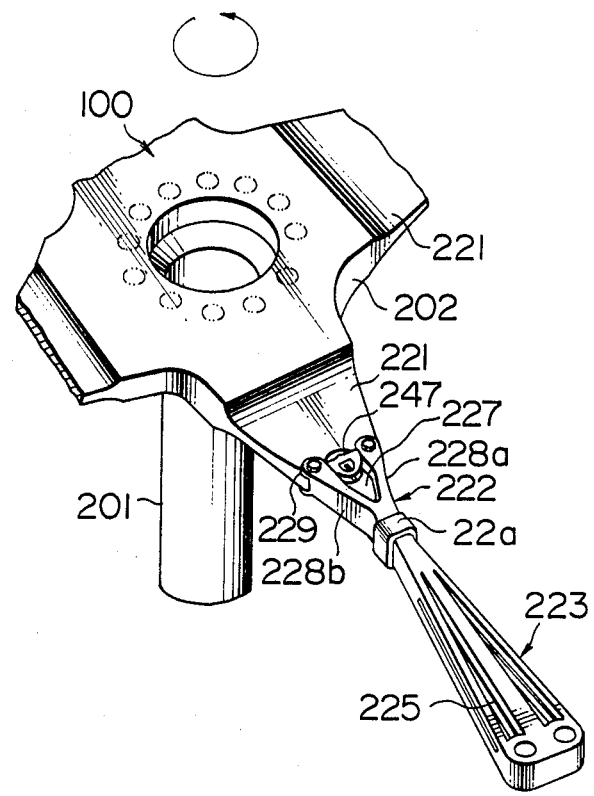
Figure 38:
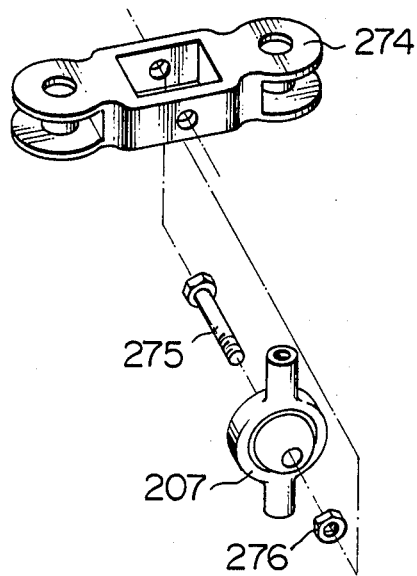
Figure 39:
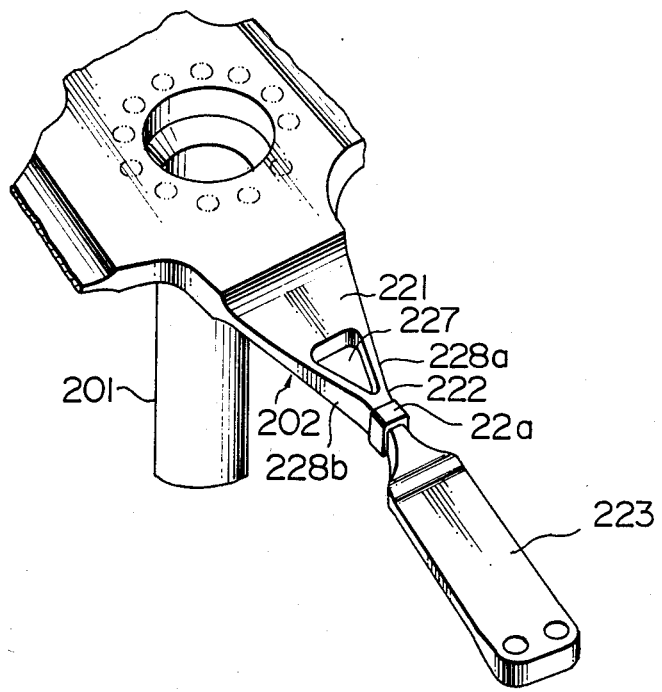

FIGS. 34(a) and (b) are diagrams showing the deformation caused by external forces;

FIG. 35 is a diagram showing an example of analysis of a specific deformation under loads;

FIG. 36 is an exploded perspective view of another embodiment for the installation of the spherical bearing;

FIG. 37 is a perspective view of still another embodiment for the installation of the spherical bearing;

FIG. 38 is an exploded perspective view showing a spherical bearing support structure in the embodiment of FIG. 37; and FIG. 39 is a perspective view of further another embodiment of the torsion element.

DETAILED DESCRIPTION OF THE PREFERRED EMBODIMENT

Figure 1:
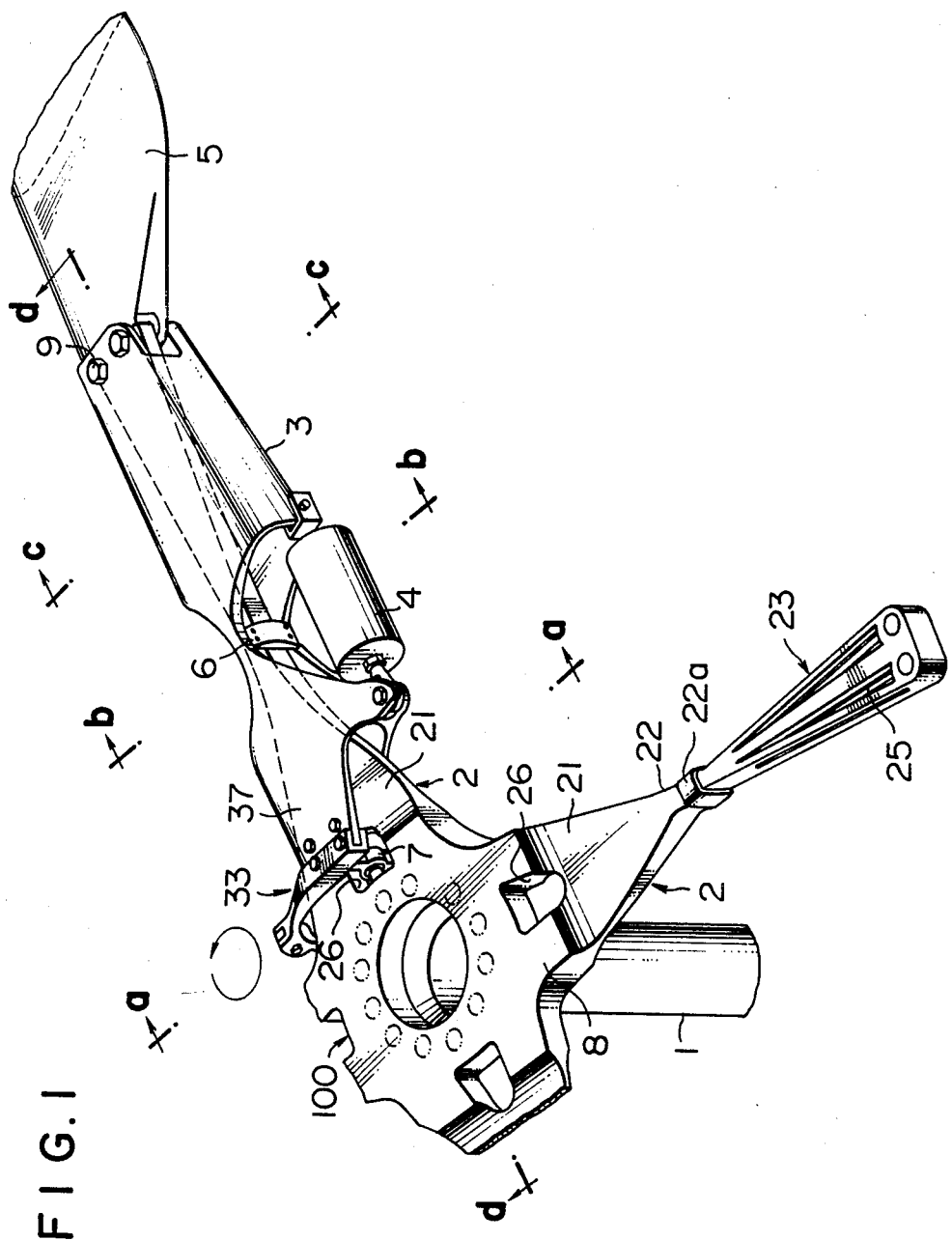
FIG. 1 is a perspective view of first embodiment of hub structure in accordance with the present invention.

Referring first to FIG. 1, a bearingless hub structrure 100 comprises a rigid hub body 8 which is secured to the top of a rotor shaft 1. The hub body 8 has four integral flexbeams 2 extending radially from the hub body at intervals of 90°. As illustrated in FIG. 1, the flexbeam 2 includes a flexible plate portion 21 with a rectangular cross section flatted in the lead-lag direction. This flexible plate portion 21 is a part that primarily effects a flapping motion. The flexbeam 2 is gradually increased in thickness radially outward from the flexible plate portion 21, at the same time decreased in width to form a flexible element 22 with it's most narrow portion. The flexible element 22 is the most soft portion the direction of rotation or lead-lag, therefore the lead-lag motion is effected at this soft portion.

Radially outside the flexible element 22, the flexbeam 2 again extends sectorially. A plurality of elongated slits 25 are formed in above sectorial portion in order to provide a torsion element 23 of very low torsional stiffness.

Figure 2:
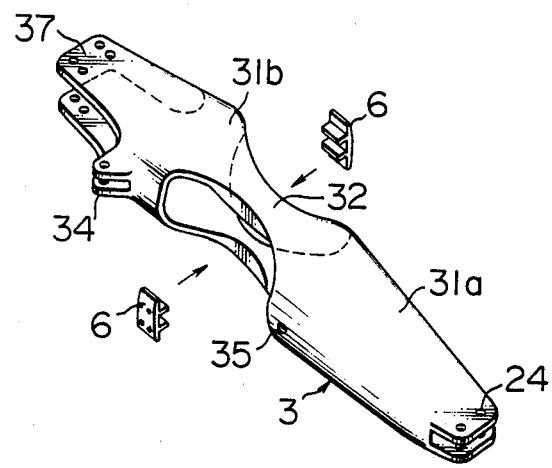
FIG. 2 is a perspective view showing details of the pitch housing.

Positioned along and outside the flexbeam 2 is a hollow pitch housing 3. As shown in FIG. 2, the pitch housing 3 of this embodiment consists of a radially outer tubular portion 31a, a radially inner tubular portion 31b, and a cut out or flexible portion 32 between two tubular portions. The pitch housing 3 is stiff in torsion about a longitudinal axis and also in the flapping direction, but soft in lead-lag direction by the flexible portion 32. As shown in FIG. 1, a lead-lag damper 4 is attached between a damper attaching lug 34 formed on the inner tubular portion 31b and a damper attaching hole 35 formed in the outer tubular portion 31a. The pitch housing 3 is arranged such that it encloses the exterior of the flexbeam 2 in a speced relationship and secured rigidly by attaching bolts 9 inserted into a bolt holes 24 which are formed in a radially outer end thereof.

Figure 3:
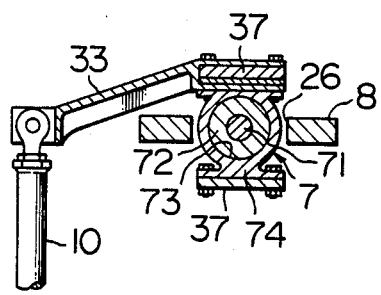
FIG. 3 is a cross sectional view taken along line a—a of FIG. 1.

As shown in FIGS. 1, 3 and 6, the hub body 8 has an opening 26 at the position corresponding to a root end of the flexbeam 2, and mounts a shaft 71 which projects into the opening 26 for carrying a ball-like bearing member 72 of a spherical bearing 7. A support member 74 which have a spherical seat 73 of the spherical bearing 7 is mounted on the inner end portion of the pitch housing 3. In this manner, the bearing member 72 is carried on the spherical seat 73. Therefore, the inner end portion of the pitch housing 3 are supported rigidly with respect to the hub body in the lead-lag and vertical directions, and capable of rotation about a longitudinal axis of the flexbeam 2. A pitch horn 33 is mounted on the inner end portion of the pitch housing 3, projecting forward in the direction of rotation. The pitch horn 33 is connected by a pitch link 10 to a conventional swash-plate (not shown) which in turn provides a control force.

Therefore, the control force from the pitch link 10 is transmitted through the pitch housing 3 to a rotor blade 5 to produce a torsional deformation of the flexbeam 2 thereby providing a pitch change for the blade 5. For a flapping motion caused by a aerodynamic force during flights, the pitch housing will not restrain the flexbeam 2 from being deflected in the flapping direction because it's inner end portion is supported by the spherical bearing 7. For a lead-lag motion, the lead-lag damper 4 can provide an adequate damping force for the lead-lag motion because the flexbeam 2 and the pitch housing 3 have the flexible element 22 and 32 respectively to deflect at these elements.

Figure 4:
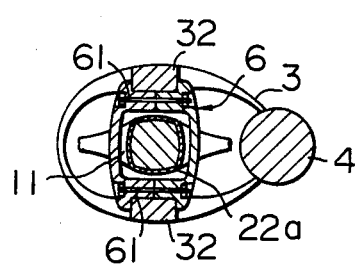
FIG. 4 is a cross sectional view taken along line b—b of FIG. 1.

In addition, a pair of stopper members 6 are attached to the flexible element 32, to surround the flexible element 22 of the flexbeam 2 as shown in FIGS. 1, 2 and 4.

Figure 10:
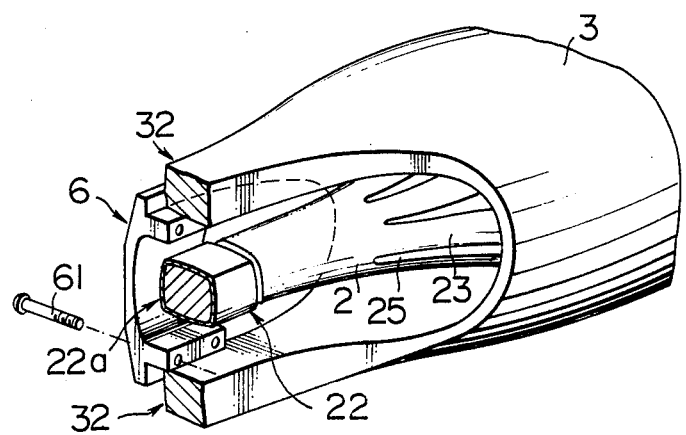
FIG. 10 is a perspective view showing details of the stopper member.
Figure 11:
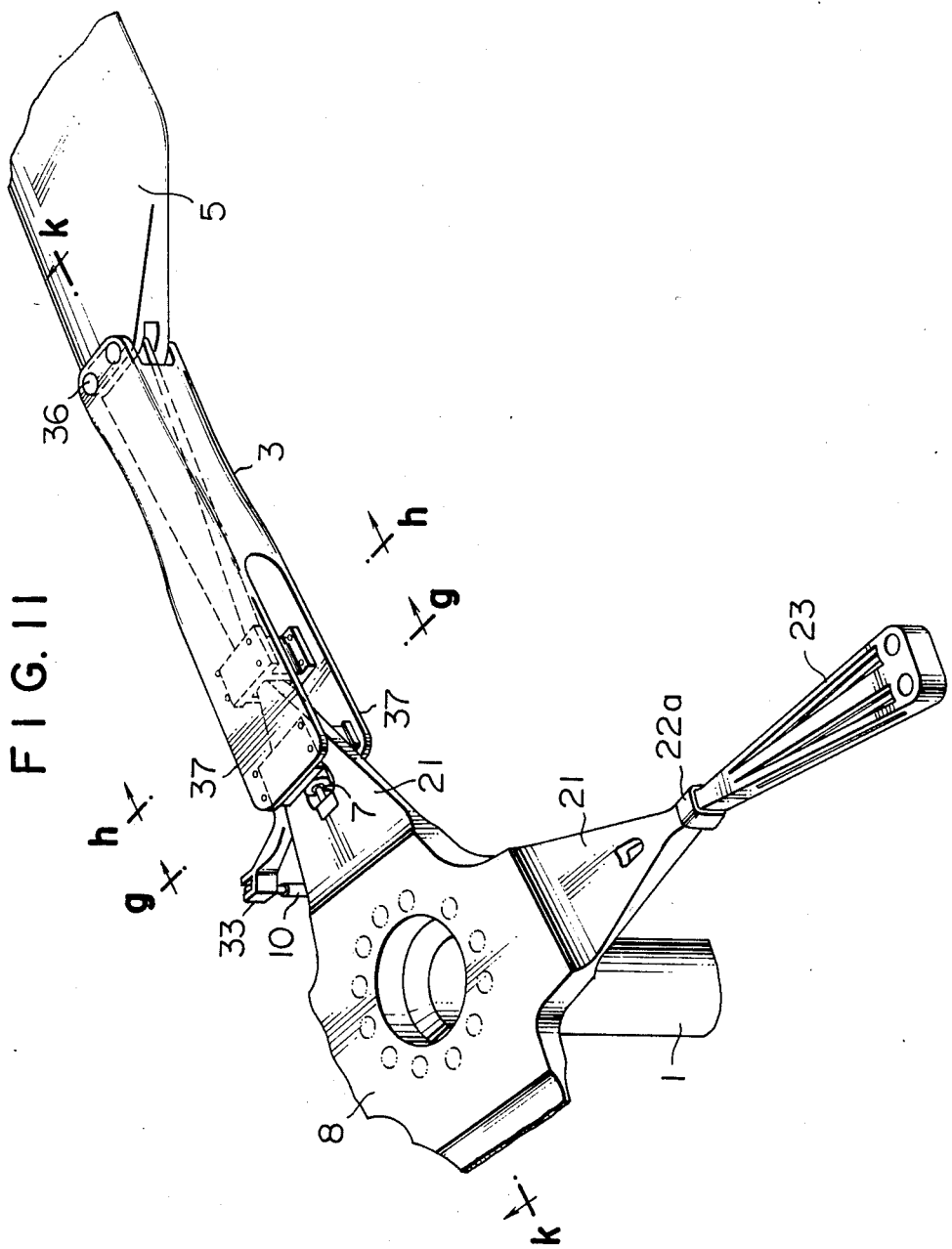
FIG. 11 is a perspective view of second embodiment of a hub structure in accordance with the present invention.

As shown in FIGS. 1, 2 and 10, the stopper members 6 are arranged such that the flexible portion 32 of the pitch housing 3 is sandwiched between two stopper members 6 in the lead and lag sides. Both stopper member are coupled by bolts 61 to each other. A wear-resistant member 22a is fastened around the flexible element 22 so that the flexbeam 2 may not be damaged even if it comes in contact with and pivots with the stopper members 6. As shown in FIG. 4, while the stopper members 6 are firmly attached to the pitch housing 3, they are spaced from the flexbeam 2 by a gap 11. Although the gap 11 is essential for normal flight conditions, it is nomally a small amount of the order of 1 to 2 mm, because the pitch housing 3 and the flexbeam 2 can be designed so that their deflection curves in the lead-lag motion have a very similar shape.

In this manner, since the stopper members 6 do not come in contact with the flexbeam 2 during normal flights, there are almost neither wear problems nor vibration problems. Of course, this stopper members may be of a type other than that described in this embodiment, for example, conventional spherical bearings or bearings utilizing elastomer may suitably be used.

Figure 5:
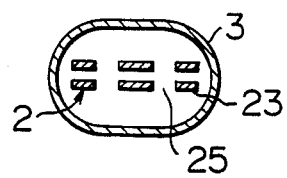
FIG. 5 is a cross sectional view taken along line c—c of FIG. 1.

As shown in FIG. 5, in radially outside the flexible element 22, the flexbeam 2 is divided into some elongated elements 23 by several slits 25. By dividing the plate in this manner, the torsional stiffness can substantially be reduced. Even if a tensile stress caused by a centrifugal force acts on that elements 23, the increment of torsional stiffness by the centrifugal force may be kept considerably small by it's sufficiently thin plate thickness and it's sector shape. Therefore, although the length of the torsion element 23 is relatively short, the required twisting angle of the order of ±10° can be obtained.

However, with making the torsion element 23 thin as described above, it may withstand a tensile stress, but will probably be buckled, when a compressive stress more than the tensile stress is produced by a large bending moment. Especially in the start up or quick stop conditions wherein the rotational speed is slow and thus the centrifugal force is small, when a large bending moment is applied, the torsion element 23 will immediately be broken by buckling. However, during flights, no matter how vigorously the helicopter maneuvers, the stress in the torsion element 23 cannot be compressive one because a large centrifugal force is applied.

Therefore, it is an important problem in this structure how to prevent the torision element 23 from being subjected to the bending moment when the rotor is rotating at low speed. Above hub structure is intended to overcome this problem. Hereinafter, operation of this hub structure will be described.

Figure 8:
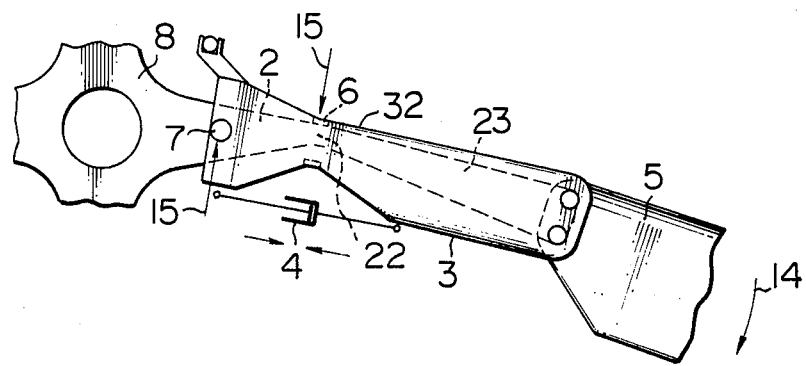
FIG. 8 is a plan view showing the lead-lad motion when quickly started from shut down condition.

FIG. 7 shows the hub structure under normal flight conditions. While a large centrifugal force 12 and a relatively small lead-lag load 13 are acting on the rotor blade, the stopper members 6 and the flexible element 22 of flexbeam 2 maintain a gap between them and continue to move without contacting with each other since relative displacements of the pitch housing 3 and the flexbeam 2 are small. FIG. 8 shows the hub structure in a state of just starting from the shut down condition. In this condition, while there's least centrifugal force, a large lag bending load 14 is applied by an inertia of the rotor blade. At this time, as the pitch housing 3 is greatly deflected, the lead-lag damper 4 which is interposed in this area will be bottomed. Thus, the pitch housing 3 and the rotor blade 5 start to swing about the spherical bearing together, thereby the gap between the stopper members 6 and the flexible element 22 decreases until the later is brought into contact with the former. As a result, the lag bending load 14 is transmitted from the pitch housing 3 to the flexbeam 2 by a couple 15 acting on a point of contact between the stopper member 6 and the flexible element 22 and the spherical bearing. At this time, since the bending load 14 does not directly act on the torsion-element, the torsion element 23 is prevented from being broken by bending. Also, it is feasible to prevent a large flapwise bending load caused by the force of gravity acting on the rotor blade when the rotor is stopped, from being transmitted to the torsion element 23 by suitable well known means. For example, as shown in FIG. 6, a striker plate 41 is attached to the lower inner end portion of pitch housing 3, and a push rod 43 is positioned opposite to the striker plate 41. The push rod 43 is slidably mounted on a housing 42 to engage it's one end with an annular stop ring 44 having a C shaped cross section along it's circumference located around the rotor shaft 1. In accordance with this construction, the blade 5 droops about the spherical bearing 7, therefore the flapwise bending load 17 is transmitted to the pitch housing 3 from the blade 5 to cause the striker plate 41 to press the stop ring 44 inwardly through the push rod 43 so that the flapwise bending load 17 may be balanced with a flapwise bending load of an opposite blade. As a result, the bending load 17 does not act on the torsion element 23.

Figure 9:
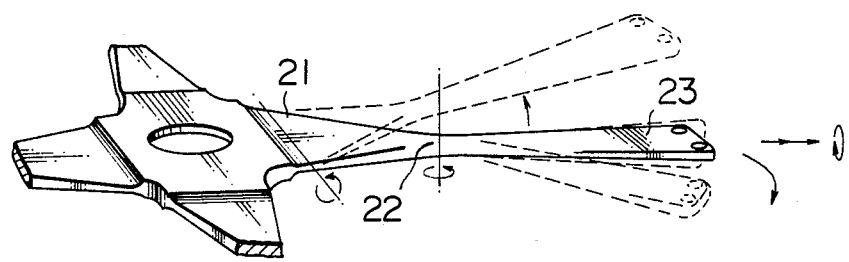
FIG. 9 is a perspective view showing functions of the flexbeam in accordance with the present invention.

In the hub structure described above, since the flexbeam 2 has a construction wherein the flapping sort portion 21, the lead-lag soft portion 22 and the torsion soft portion 23 are arranged in order from radially inboard, it is capable of making motions for each directions without interaction as is the conventional fully articulated hub mechanisms. That is, as shown in FIG. 9, a flapping motion is produced at the flapping soft portion 21, specially at most root end, but almost not at other portions. A lead-lag motion is not produced at portions other than the lead-lag soft portion 22 because it is made flexible in the lead-lag direction. Similarly, the torsion soft protion 23 produces a torsional motion only. As described previously, these are completely the same motions as that of conventional, fully articulated hubs utilizing needle roller bearings wherein the flapping motion, lead-lag motion and torsional motion are completely separated so that they can not affect each other. Therefore, a so-called aerodynamic coupling which is a very complicated, instable motion will not occur on the rotor blade.

As in this embodiment, by forming the torsion element 23 in the form of a sector extending from the narrowed flexible element 22, it is possible to decrease the torsional stiffness of the torsion element 23. Additionally, by providing slits for said torsion element 23, it is possible to further decrease the torsional stiffness.

Figure 12:
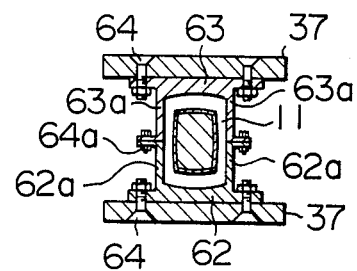
FIG. 12 is a cross sectional view taken along line h—h of FIG. 11.
Figure 13:
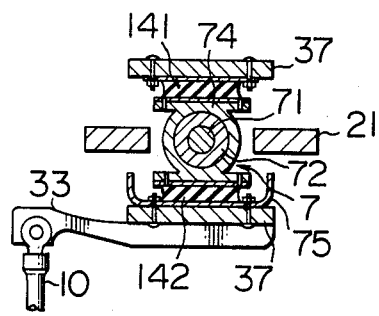
FIG. 13 is a cross sectional view taken along line g—g of FIG. 11.
Figure 14:
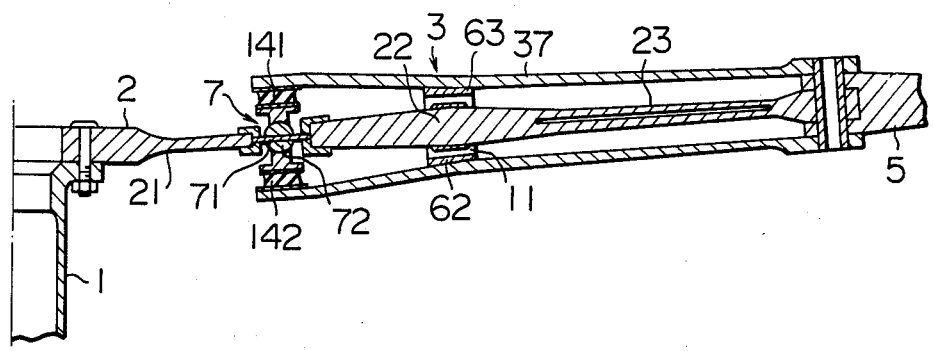
FIG. 14 is a cross sectional view taken along line k—k of FIG. 11.

In another embodiment shown in FIGS. 11 through 16, the pitch housing 3 is branched into an upper and lower rectangular plate members 37 radially inward. There widths in the lead-lag direction are substantially constant. Therefore, the pitch housing 3 of this embodiment is also stiff in the lead-lag direction. As shown in FIG. 13, the inner ends of the pitch housing includes an upper and lower lead-lag damper 141, 142 in the form of plate on it's interior surfaces, and a spherical bearing 7 is installed between said lead-lag damper 141 and 142. While the plate members 37 of the pitch housing 3, lead-lag dampers 141, 142 and spherical bearing 7 are secured to each other, the lead-lag dampers 141, 142 allow the pitch housing to pivot in the direction of rotation with respect to the spherical bearing 7.

Figure 15:
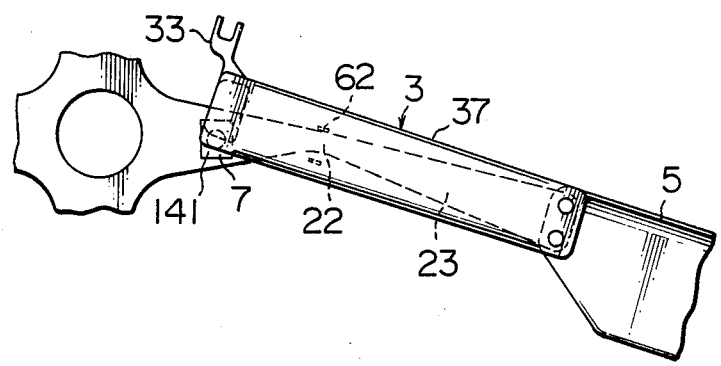
FIG. 15 is a plan view showing functions of second embodiment.

As shown in FIG. 15, however the pitch housing 3 is swung out of the flexible element 22 of the flexbeam 2 in lead and lag sides as an extension of the rotor blade in the lead-lag motion, the lead-lag dampers 141, 142 mounted on the inner ends of the pitch housing 3 is subjected to a shear deformation because respective one side of dampers are fixed with the spherical bearing 7 in the plane of rotation.

At the position corresponding to the flexible element 22 of the flexbeam 2, stopper members 62, 63 are attached by screws 64 to interior surface of the plate member 37 of the pitch housing 3 as shown in FIG. 12. The stopper members 62, 63 having a pair of legs 62a, 63a respectively, are positioned so that the flexible element 22 is spaced between these legs 62a and 63a. The legs 62a, 63a are positioned so as to about and coupled to each other by bolts 64a.

As shown in FIG. 13, a stopper 75 is interposed between the lead-lag damper 142 and the lower plate member 37 of the pitch housing 3 so that a support member 74 of the spherical bearing 7 is engaged against said stopper 75 when the flexbeam 2 is deformed to the predetermined amount of lead-lag flexure, thereby causing the lead-lag damper 142 to be shear deformed. As a result, when a large lead-lag bending load is applied at low rotational speeds, a couple acting between the stopper 75 and the stopper members 62, 63 carries this bending load so that the latter is not transmitted to the torsion element 23 as in the foregoing embodiment. In this embodiment, as shown in FIG. 12, installation of the stopper members 62, 63 is very easy because of the wider plate member 37 of the pitch housing 3.

Also, this embodiment is advantageous that the pitch housing can easily be designed because no flexible element is provided for the pitch housing differently from the forgoing embodiment.

Figure 16:
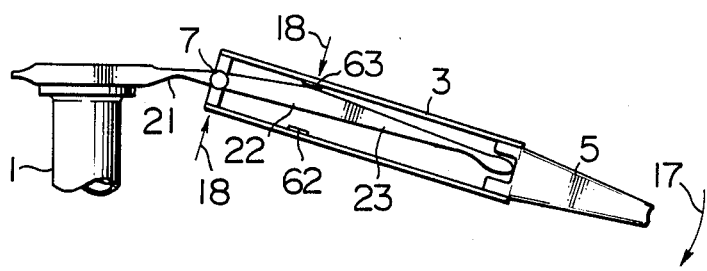
FIG. 16 is a cross sectional view showing shut down condition.

However, the spherical bearing may be mounted radially outside the flapping soft portion 21 of the flexbeam 2 as in this embodiment. In this case, a bending deflection is little in the outside from the spherical bearing 7, therefore, a relative displacement between the stopper members 62, 63 attached to the pitch housin 3 and flexbeam 2 is also little. Then, as previously described in respect with the lead-lag direction in first embodiment, by providing a small gap between the flexbeam and the stopper members 62, 63 for the flapping direction, the stopper members and the flexbeam are not in contact with during flights, but come in contact with each other under shut down condition, producing a couple 18 which in turn carries a droop moment 17 caused by the gravity force as shown in FIG. 16. As a result, the bending load is transmitted to the hub body, but not to the torsion element.

Figure 17:
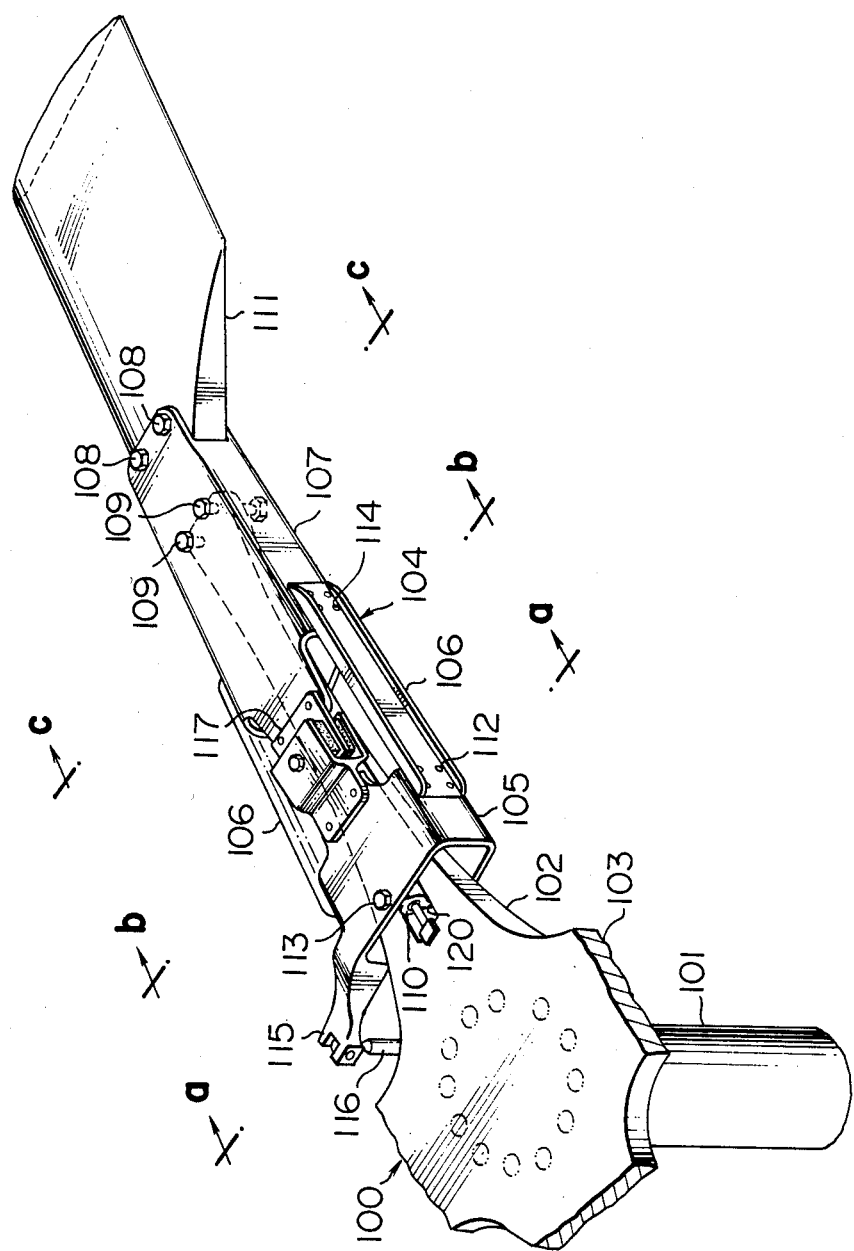
FIG. 17 is a perspective view of third embodiment of a hub structure in accordance with the present invention.

Referring now to FIG. 17, a bearingless hub structure 100 includes a rigid hub body 103 secured to the top of a rotor shaft 1. The hub body 103 has four integral flexbeam 102 extending radially from the hub body at intervals of 90°. As illustrated in FIG. 17, the flexbeam 102 is formed elongatedly to be very flexible in the flapping and lead-lag directions.

Figure 18:
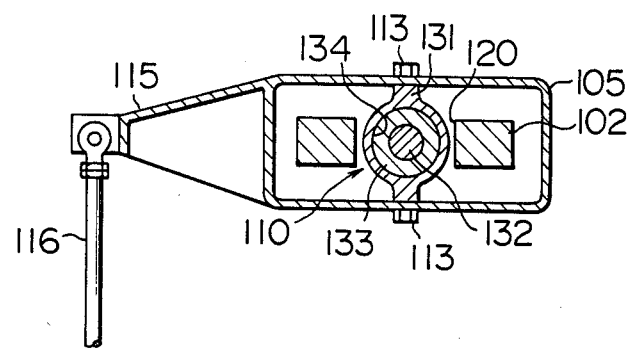
FIG. 18 is a cross sectional view taken along line a—a of FIG. 17.
Figure 20:
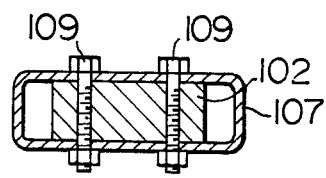
FIG. 20 is a cross sectional view taken along line c—c of FIG. 17.

There is provided a pitch housing 104 enclosing the flexbeam 102. The pitch housing 104 consists of an inner end portion 105, an outer end portion 107 and a pair of bridge members 106 located in lead lag sides for coupling the inner and outer end portions to each other. The pitch housing inner end portion 105 is generally tubular, having a radially outer end secured to the bridge members 106 by bolts 112 and a radially inner end secured to a spherical bearing 110 by bolts 113. A spherical bearing 110 is positioned in a root end of the flexbeam 102 of the hub body 103 i.e., an opening 120 formed in the radially inner end. The pitch housing inner end portion 105 is supported to be able to rotate by the spherical bearing 110 on the flexbeam 102. As shown in FIG. 18, the spherical bearing 110 includes a housing 131 having a spherical lining 131 attached on the interior surface of the housing 131. A ball 133 which rolls in contact relationship with the lining 134 is positioned in the housing 131. A shaft 132 inserted through the ball 133 has opposite ends secured to the flexbeam 102. The housing 131 is attached to the pitch housing inner end portion 105 by bolts 113. The bridge member 106 is also rigidly secured to the pitch housing outer end portion 107 by bolts 114. The pitch housing outer end portion 107 has a radially outer end secured rigidly to a rotor blade 111 and to the tip of the flexbeam 102 by bolts 108 and 109 respectively. FIG. 20 shows a connection of the pitch housing outer end portion 107 and the flexbeam 102.

Figure 19:
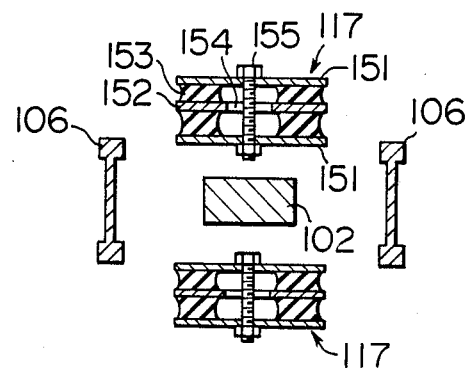
FIG. 19 is a cross sectional view taken along line b—b of FIG. 17.
Figure 21:
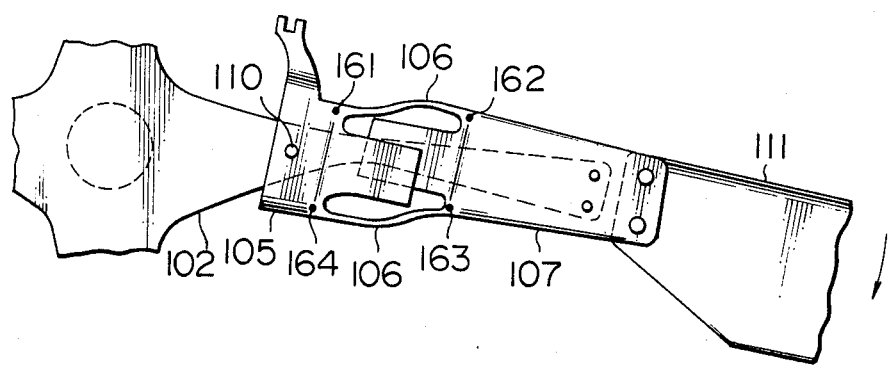
FIG. 21 is a plan view showing the lead-lag motion of rotor blade.
Figure 22:
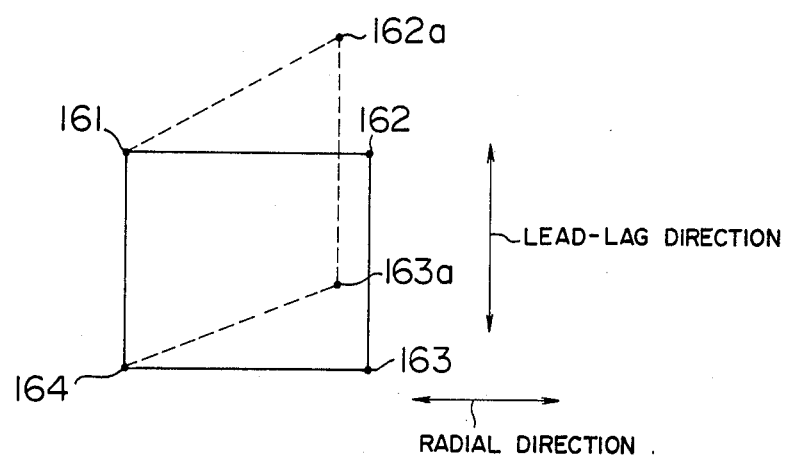
FIG. 22 is a schematic diagram showing functions of bridge elements of the pitch housing.

Preferably, the bridge members 106 each has a I shaped cross section as shown in FIG. 19, this cross section being adapted to make the bridge member 106 soft in the lead-lag direction and stiff in the flapping direction. As the bridge members 106 are arranged to radially extend in lead and lag sides, they are deformed by a bending load when the rotor blade makes a lead-lag motion as shown in FIG. 21. Movements of points 161, 162 and 163, 164 of opposite ends of the bridge member 106 of the pitch housing are shown in FIG. 22, point 162 being moved to point 162a and point 163 being moved to point 163a. As seen in FIG. 22, the relationship between four points is such that a quadrangle transforms into a parallelogram, therefore points 161, 164 of the inner end and points 162, 163 of the outer end move parallel without accompanying by an angular motion. A pair of lead-lag damper 117 are positioned between a upper and lower inner end portions 105 of the pitch housing 104 and an upper and lower outer end portions 107 respectively, in order to provide a damping force for this parallel movement. It is apparent from above description that the parallel movement due to the deformation of the bridge members 106 transmits purely a shear force only to the dampers 117 coupling the inner and outer end portions 105, 107 to each other. That is, the inner end portions 105 and the outer end portions 107 are moved parallel by the lead-lag motion of the rotor blade without making a relative angular motion. Thus, the bearings which was required traditionally to absorb the angular motions at damper installing points, are unnecessary, and the dampers 117 can be secured rigidly to each of the inner end portions 105 and each of the outer end portions 107.

Figure 24:
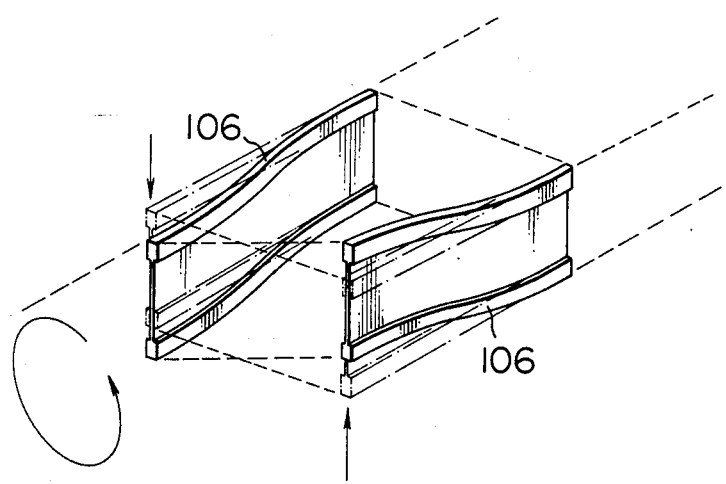
FIG. 24 is a perspective view showing the deformation of bridge elements of a pitch housing when a torsional moment is applied on the pitch housing.

The bridge members 106 must carry a control force which is transmitted to the rotor blade through the pitch housing 104, since the bridge member 106 is located radially at a center area of the pitch housing 104. This cotrol force is applied on the pitch housing as a torsional moment. FIG. 24 shows a state of the deformation of the bridge members 106 when this torsional moment is applied. It is apparent from the drawing that by providing a pair of bridge members 106 in lead and lag sides, the torsional moment is transformed into a flapping flexure of each bridge member. Since the bridge members 106 are capable of providing a relative high flapping stiffness and thereby a relative high torsional stiffness as described previously, the bridge members 106 may effectively satisfy such function as to transmit the control force of the pitch housing.

Figure 23:
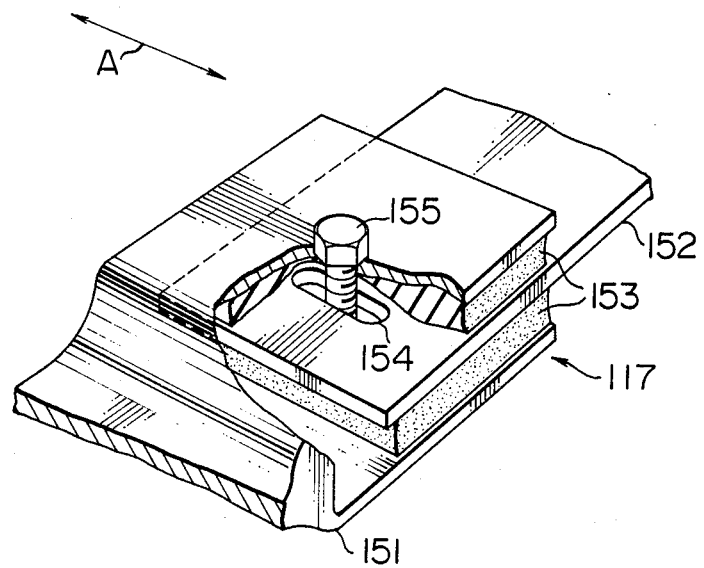
FIG. 23 is a perspective view of a lead-lag damper.

As shown in FIGS. 19 and 23, the lead-lag damper 117 consists of a damper fitting 151 attached to the pitch housing inner end portion 105, a damper fitting 152 attached to the outer end portion 107 and an elastormer members 153. The fitting 151 is branched into an upper and lower plates and connected to the fitting 152 through the elastomer members 153 which are sandwiched between the plates and bonded to the fitting 151 and 152. The damper fitting 151 is tightened with a bolt 155 which is passed through a center portion thereof, in order to pre-compress the elastomer member 153 to thereby prevent it from being subjected to a peel force. The bolt 155 is installed tightly on the fitting 151 but loosely on the fitting 152 through an elongated hole 154. As shown in FIG. 23, the elongated hole 154 is tailored to have a given gap for the lead-lag direction A between the bolt 155 and the elongated hole 154, and a little gap for the radial direction. As a result, when the lead-lag angle reaches to a predetermined angle, the bolt 155 come in contact with the elongated hole 154 of the fitting 152 thereby preventing further deformation of the elastomer members 153. Also, by providing a little radial gap between the bolt 155 and the elongated hole 154, the control force can be transmitted by the fittings 152, 154 and the bolt 155 of each damper, even if the transmission of flapping load become difficult due to an accidental failure of the bridge members 106. Of course, it is possible to provide a lead-lag movement limiting mechanism comprising of the fitting 151, the elongated hole 154 and the bolt 155, and a flapping load transmission mechanism independently of the dampers. Preferably, the lead-lag movement limiting mechanism is positioned adjacent to the spherical bearing 110 as close as possible. The reason is to reduce loads applying on the bridge members 106, and will subsquently be explained in detail.

Figure 25:
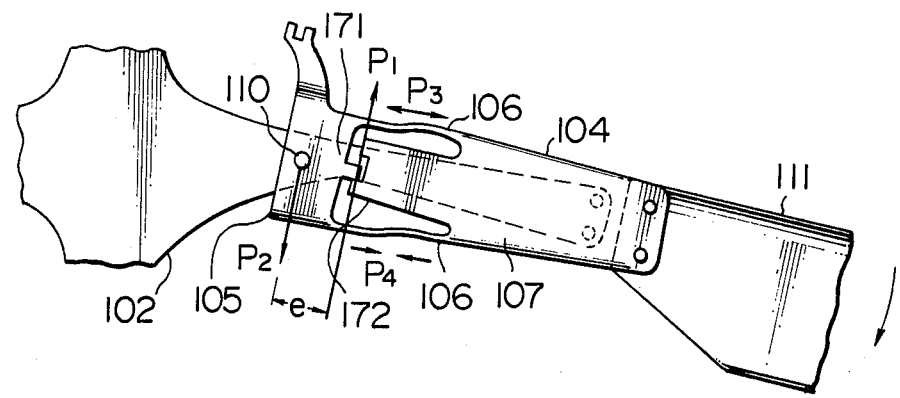
FIG. 25 is a plan view showing functions of a lead-lag stopper.
Figure 26:
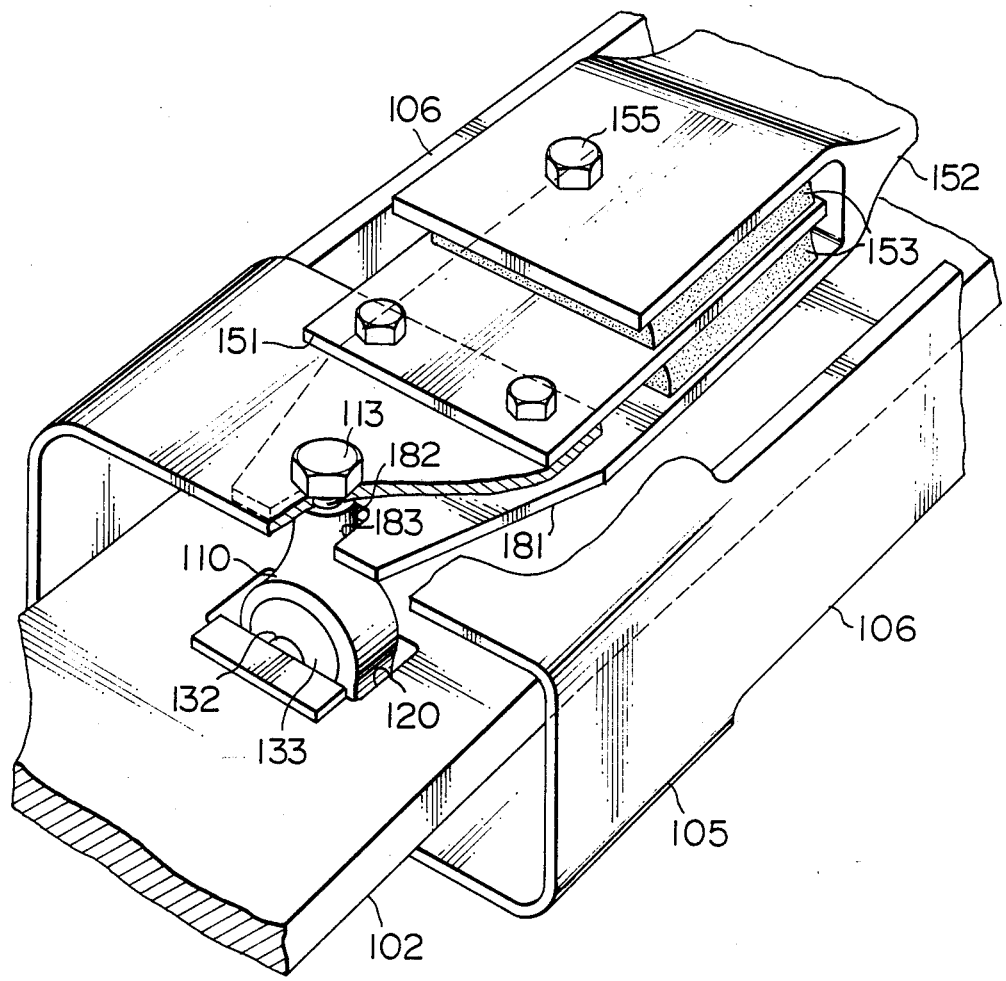
FIG. 26 is a perspective view of another embodiment of the lead-lag stopper.

As shown in FIG. 25, another lead-lag movement limitting mechanism is formed with radially extending projections 171 formed on an upper and lower outboard ends of the inner end portion of the pitch housing 104 and notched recesses 172 formed on an upper and lower inboard ends of the outer end portion 107. When an excessive lead-lag load is applied on the rotor blade 111, the lead-lag movement limitting mechanism functions to apply a load $P_1$ on the projections 171 of the inner end portions 105. While this load $P_1$ is, as a shear force, transmitted to the flexbeam 102 of the hub by the spherical bearing 110, a rotating moment (which is the product of the load $P_1$ and the distance e) yet remains about the spherical bearing 110. This moment produces a tensile force $P_3$ for the front bridge member 106 and a compressive force $P_4$ for the rear bridge member 106. It is unpreferable that there's a possibility of buckling of the bridge member 106 because of it's low lead-lag stiffness. In order to reduce the compressive force acting on the bridge member 106, the rotating moment and therefore the distance e should be as small as possible. That is, it is necessary to position the lead-lag movement limitting mechanism adjacent to the spherical bearing 110 as close as possible. FIG. 26 shows an example of a method how to produce no rotating moment by making the distance e zero.

In this example, a damper fitting 152 secured to the pitch housing outer end portion 107 is branched into two plate members, and a notch 183 is formed on an inboard end 181 of lower plate member. A shaft 182 of the spherical bearing 110 inserted through the notchs 183, is secured to the pitch housing inner end portions 105 by bolts 113. A lead-lag gap between the notch 183 and the shaft 182 is tailored so that the dampers can move to a predetermined magnitude in the lead-lag direction. In this manner, the lead-lag movement limitting mechanism may be formed with the shaft 182 and the notchs 183 to prevent the bridge members 106 from being subjected to the compressive force as the result that loads applied on the this mechanism are directly transmitted to the spherical bearing 110 through the shaft 182. A suitable damper of friction plate type may be used instead of the elastomer member 153.

As described previously in reference with FIG. 18, in the spherical bearing 110 connecting the pitch housing inner end portion 105 to the flexbeam 102, the ball 133 is attached to and movable along the shaft 132 in the radial direction in an extent of the opening 120 of the flexbeam 102. This is required to make the pitch housing inner end portion 105 to be radially movable, because the radial distance between the inner end portion 105 and the outer end portion 107 decreases slightly when the rotor blade makes a lead-lag motion.

As shown in FIG. 18, the pitch housing inner end portion 105 is provided with a pitch arm 115 which in turn is connected to conventional type swashplate (not shown) through pitch link 116 to receive a control force. There's no possibility of an aerodynamic coupling because the distance between the spherical bearing 110 and the pitch link 116 is kept constant structurally.

Since the spherical bearing 110 is directly secured to the pitch housing inner end portion 105, the thickness of the inner end portion 105 can be thinned to such an extent as a proper clearance is formed between the flexbeam 102 and the inner end portion 105. This is advantageous in weight and drag reductions.

Figure 27:
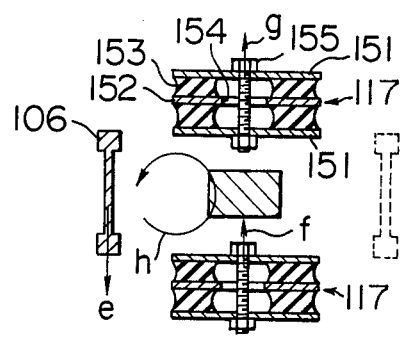
FIG. 27 is a transverse cross sectional view showing a way of transmission of control force when either of bridge elements is broken.

The pitch housing described above is thoroughly secured from damages. For example, even if either of the bridge members 106 is damaged, losing it's load carrying ability, safety is thoroughly assured. That is, since the damper 117 have a flapping load transmitting ability, the strength and stiffness essentials for rotor blade control are maintained. As shown in FIG. 27, a control torque h can be produced by a pair of couple e and f, g. One component of the couple e is transmitted by the remaining non-damaged bridge member 106, while other components f, g are transmitted by the upper and lower lead-lag dampers 117 respectively. As the damdpers having the elastomer members 153 are sufficiently soft in the shearing direction (lateral direction), but stiff in the thickness direction (vertical direction), they can not only transmit forces but also provide a sufficient torsional stiffness for the pitch housing. Therefore, there's no possibility of aeroelastic instabilities such as flutter.

Figure 28:
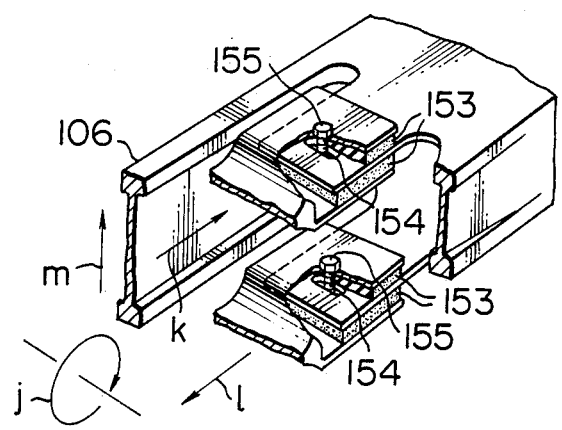
FIG. 28 is a perspective showing a flapping reaction force.

For a bending moment in the flapping direction as shown in FIG. 28, a bending moment j is supported by a pair of couple k, l produced in the upper and lower lead-lag dampers and a vertical shear component m is transmitted by the bridge members 106. As explained in FIG. 27, cordwise forces can be supported without the need of the front and rear bridge members, however when either of the bridge members 106 is broken, the lead-lag dampers do not operate effectively because the pitch housing inner end portion 105 is swiveled, so that the lead-lag damping which is necessary for preventing ground resonance and air resonance become insufficient. However, the ground resonance and air resonance of helicopters are interactions between four rotor blades, further, each lead-lag damper has a margin for damping sufficient to prevent such mechanical instabilities, therefore if one damper mounted on any one of four rotor blades are inoperative, the dampers of three remaining rotor blades can afford to prevent such instabilities.

While the breakage of the bridge members which is the most vulnerable structural member has been described, if one of the lead-lag dampers is broken, safety is maintained for aforementioned reasons. The remaining portions of the pitch housing have large cross section area, therefore if partially damaged, there's no problem in strength and stiffness because the resultant stress is small. In this manner, the pitch housing described above has a failsafe structure and a high structural reliability which are the most important factors for aircrafts.

Each bridge members 106 is preferably made of composite material of high fatigue strength, and in practice, most preferably formed as an integral part of the pitch housing. An example of such integrated bridge member is shown in FIG. 29.

In this example, the rotor blade and the pitch housing outer end portion are also formed integrally. As described above, the present invention is characterized in that the bridge members positioned at the center portion of the pitch housing, are able to deform at the portion in lead and leg sides. In order to accomplish this function, it is preferable to make other portions as stiff as possible not to be deformed.

Since a connection of the pitch housing and the rotor blade is bolted, a play in the connection cannot be avoided, thereby causing an effect such as the stiffness of the connection is apparently decreased. As a result, when the rotor blade makes a lead-lag motion, apparent deformations is produced in accordance with the amount of plays in the rotor blade and the pitch housing fitting portion as well as the flexbeam and the bridge members, resulting in a reduction of damping. In order to prevent this effect, it is preferable to form the pitch housing as an integral part of the rotor blade. This also contributes toward realizing a reduction of cost because the number of parts is decreased and the complicated machining of the connection is unnecessary. Such integral formation may easily be accomplished by recent techniques of composite materials.

Referring now to FIG. 30, a bearingless hub structure 100 includes a rigid hub body 208 secured to the top of a rotor shaft 201. The hub body 208 has four integral flexbeam 202 extending radially from the hub body at intervals of 90°. The flexbeam 202 includes at it's root end, a plate spring-like portion 221 with a rectangular cross section flat in the lead-lag direction. This plate spring-like portion is a part which primarily effects a flapping motion. The flexbeam 202 includes a flexible element 222 radially outside the plate spring-like portion 221. The flexible element 222 consists of two beam-like members 228a, 228b having radially inner ends spaced in the lead-lag direction. The beam-like members 228a, 228b extend radially outward with narrowing the distance between them, thereby forming a triangle. Formed between the beam-like members 228a and 228b, is a triangular space 227. The flexible element 222 is the most soft portion in the direction of rotation or lead-lag, and a lead-lag motion is effected at this portion.

Radially outside the flexible element 222, the flexbeam 202 again extends sectorially. A plurality of elongated slits 225 is formed in above sectorial portion to provide a torsion element 223 of very low torsional stiffness.

Positioned along and outside the flexbeam 202 is a hollow pitch housing 203 enclosing the flexbeam 202. As shown in FIGS. 30 and 31, the pitch housing 203 consists of an inner end portion 232, an outer end portion 231 and a pair of bridge members 233 for connecting the inner and outer end portions to each other in lead and lag sides. The inner end portion 232 of the pitch housing 203 is generally tubular and secured to a spherical bearing 207 by bolts 271. The flexbeam 202 has a fitting 272 which is secured to an opening portion 227. The fitting 272 mounts a pin 272a projecting radially, on which the spherical bearing 207 is pivotably supported. In this manner, the spherical bearing pivotably supports the pitch housing inner end portion 232. The pitch housing outer end portion 231 is rigidly secured at it's radially outer end to an inboard end of rotor blade 205 and to a tip end of the flexbeam 202 by bolt 209. A pair of dampers 241, 242 are positioned at the upper and lower sides of the pitch housing 203, across the pitch housing outer end portion 231 and the inner end portion 232 to provide a lead-lag damping.

The damper 241 includes an upper plate 241a, a lower plate 241b and an intermediate plate 241c interposed between the upper and lower plates 241a, 241b. Elastomer members 241d are sandwiched between the upper plate 241a and the intermediate plate 241c, and between the intermediate plate 241c and the lower plate 241b respectively. The upper and lower plate 241a, 241b are secured to the pitch housing inner end portion 232, and the intermediate plate 241c is secured to the pitch housing outer end portion 231 respectively. The damper 242 has a similar structure.

As shown in FIG. 32, when the rotor blade 205 makes a lead-lag motion, the rotor blade 205, the pitch housing outer end portion 231 and the flexbeam 202 are deformed by a bending moment. The rotor blade is subjected to a centrifugal force CF and a bending moment M, however, in this case, radially inner portions are intensively deformed as if the rotor blade makes the lead-lag motion about an equivalent hinge 0. On the other hand, the pitch housing inner end portion 232 is pivotably mounted on the spherical bearing 207 and connected to the pitch housing outer end portion 231 by the bridge members 233, therefore the bridge members 233 are deformed so that the pitch housing outer end portion 231 and the inner end portion 232 are moved parallel to each other, resulting in a displacement in the lead-lag damper 241 installed between the outer end portion 231 and the inner end portion 232. The amount of displacement of the damper 241 is represented by the distance d between a rotor pitch axis e passing through the equivalent lead-lag hinge 0 and a line parallel to the axis e passing through the spherical bearing 207. The lead-lag damper produces a damping reaction force in proportion to said displacement. This force is, on one side, carried by the spherical bearing 207 and on other side, transmitted to the pitch housing outer end portion 231, and in turn to the torsional flexible damper 223 of the flexbeam 202 through the rotor blade 205. By this force, the lead-lag flexible element 222 of the flexbeam 202 is deformed because it is the most weak and soft portion.

FIGS. 33 and 34 are diagrams showing how the flexbeam 202 of the hub structure of the present invention is deformed following the lead-lag motion of the rotor blade. As shown in FIG. 34(a), a damper reaction force F provides a compressive force $-L$ for the beam-like member 228a and a tensile force $+L$ for the beam-like member 228b respectively, and a centrifugal force CF provides tensile forces CF/2 for the beam-like members 228a, 228b respectively. In this manner, the external forces F, CF are carried, as axial forces, by the beam-like members 228a, 228b, therefore the displacement $\delta$ in the lead-lag direction is very little. Also, as shown in FIG. 34(b), a bending moment M causes the triangle defined by the beam-like members 228a, 228b to be deformed, resulting in an angular displacement $\theta$ at the apex of the triangle. The FIG. 35 shows a result of analysis of deformation of the flexible element 222, on assuming the external forces acting on the actual rotor blade, wherein the solid lines show the underformed condition and the dotted lines show the deformed condition. As seen in the drawing, according this structure, there's almost no deformation in the lead-lag direction, while rotational deformation or angular displacement $\theta$ having a rotation center at the position corresponding to the apex of the triangle formed with the beam-like members 228a, 228b is produced. This rotation center becomes an equivalent hinge 0 described above. This angular displacement $\theta$ produces deformation of the bridge member 233 of the pitch housing 203 as shown in FIG. 32, so that a large lateral displacement is produced between the upper and lower plates 241a, 241b and the intermediate plate 241c, resulting in a sufficient damping force. Similarly, the lead-lag damper 242 produces a large damping force.

Further, as shown in FIGS. 30 and 31, for limiting the deformation of the flexbeam 202 in the plane of rotation and the downward deflection of the flexbeam 202 to certain levels during shut down respectively, stoppers 262, 263 are mounted within the pitch housing 203.

An embodiment shown in FIG. 36 is basically the same as the embodiment described above except a support structure of the spherical bearing 207. That is, a semicircular bridge structure 229 is formed in the space 227 of the triangle of the flexible element 222, and a pair of adaptors 272 and a center shaft 273 which supports the spherical bearing 207 are mounted in a circular space 230 defined by the bridge structure 229. In this arrangement, the spherical bearing 207 can be mounted without adversely affecting the construction of the present invention.

An embodiment shown in FIGS. 37 and 38 is basically the same as the embodiment described above, however the flexbeam 202 is divided into a plate spring portion 221 which is flexible in the flapping direction and a flexible element 222. The flexible element 222 and the torsion element 223 are preferably made of organic fibers such as Kevlar impregnated with resin. The plate spring portion 221 is suitably made of glass fiber-resin composite materials. The flexible element 222 comprises two beam-like member 228a, 228b each having, at a radially inner end, a fitting attached to the plate spring portion 221 by bolt 229. In accordance with this structure, respective components may be made of optimum materials which will provide a compact design as a whole. Also, a support fitting 274 of the spherical bearing 207 is designed to be attached by bolts 229 so that the spherical bearing 207 can be installed without adversely affecting the construction of the present invention.

In an embodiment shown in FIG. 39, the torsion element 223 comprises a thin plate having a substantially constant width instead of a triangle. This structure increases a lead-lag stiffness of the torsion element 223, and further improves an efficiency of the damper. The torsion element 223 must be a sufficiently thin plate, however, with making the width nallowed along it's length as in previous embodiments, the torsional stress and stiffness may be increased conversely because the plate can not be thinned. According to this embodiment, above disadvantage can be overcomed. It will be appreciated that even if such wide torsion element 223 is used, it creates no problem in the construction and effects of the present invention.

The main rotor of helicopters is equivalent ot the sum of the control mechanism, lift generating mechanism and thrust generating mechanism of fixed-wing aircrafts, therefore it is the most important portion for helicopters. Additionally, a fact that the rotor blade is a rotating body which is rotating at high speeds and also subjecting to varying aerodynamic forces during each revolution, creates many problems such as various instable vibrations and fatigue strength and frequently the problem of the controllability of helicopter. Therefore, it is very difficult to design a compact light hub structure which simultaneously satisfies all design requirements for many aspects.

The bearingless hub structure in accordance with the present invention is operationally equivalent to one in which prior articulated hub is replaced by the plate springs of composite materials. Thus, respective characteristics of the motions in the flapping, lead-lag and pitch change directions can independently designed so as to eliminate mutual interferences or so-called couplings. This facilitates to solve above problems.

Also, as the torstion element cannot be subjected to the bending loads, it is possible to select a very torsionally soft shape. As a result, a more compact design than in the case wherein all flexbeam portions are torsionally soft, may be realized at a low cost.

While specific embodiments of the present invention have been illustrated and described, it should be understood that the invention is not limited to the details of the specific embodiments and that changes and modifications may be made within the scope of the following claims.

What is claimed is:

1. A bearingless hub structure for rotary-wing aircraft comprising:
 a hub body secured to a rotor shaft,
 a plurality of radially extending flexbeams integrally formed with said hub body,
 pitch housings enclosing respective ones of said flexbeams in spaced relationship,
 each of said pitch housings having a radially outer end portion rigidly secured to an inboard end of a rotor blade and a radially inner end portion supported by spherical bearing means in the vicinity of a root end of said flexbeam,
 each of said flexbeams including first flexible means of low lead-lag stiffness and second flexible means of low torsional stiffness located radially outside said first flexible means,
 said first flexible means comprising two beam-like members which extend radially outward, said beam-like members having radially inner ends spaced in the lead-lag direction, and the distance between said beam-like members decreasing in the radially outward direction,
 said first flexible means having a radially outer end connected to a radially inner end of said second flexible means.

2. A hub structure in accordance with claim 1 in which a space of triangular configuration is defined between said beam-like members, ending at the radially inner end of said second flexible portion.

3. A bearingless hub structure for rotary-wing aircraft comprising:
 a hub body secured to a rotor shaft;
 a plurality of radially extending flexbeams integrally formed with said hub body;
 pitch housings enclosing respective ones of said flexbeams in spaced relationship;
 each pitch housing having a radially outer end portion rigidly secured to an inboard end of a rotor blade and a radially inner end portion supported in the vicinity of a root end of said flexbeam by spherical bearing means;
 each of said flexbeams including a first flexible portion having a low lead-lag stiffness and a second flexible portion located radially outside said first flexible portion and having a low torsional stiffness;
 said first flexible portion including a pair of beams which extend radially outward, said beams having radially inner ends spaced in the lead-lag direction, and the distance between said beams decreasing in the radially outward direction;
 said beams having radially outer ends connected to a radially inner end of said second flexible portion; and
 stopper means provided for cooperation with said first flexible portion for preventing said flexbeam from further deflection with respect to the pitch housing when a deflection in the lead-lag direction of the flexbeam reaches a predetermined value.

4. A bearingless hub structure as claimed in claim 3, wherein said flexbeams have a spring-like portion of generally rectangular cross section allowing a flapping motion radially inside said flexible element.

5. A bearingless hub structure in accordance with claim 3 in which said stopper means includes stopper members which are positioned to provide a gap sized such that said flexbeam does not come in contact with said pitch housing during normal flight.

6. A bearingless hub structure in accordance with claim 3 in which said flexbeam tapers its cordwise width to a narrow portion by which said first flexible means is formed.

* * * * *